(No Model.)

2 Sheets—Sheet 1.

J. BIRKENHEAD.
TURRET OR TOOL SUPPORT.

No. 303,975. Patented Aug. 26, 1884.

Witnesses
S. N. Piper
C. P. Pratt.

Inventor.
John Birkenhead.
by R. H. Eddy atty.

(No Model.) 2 Sheets—Sheet 2.
J. BIRKENHEAD.
TURRET OR TOOL SUPPORT.
No. 303,975. Patented Aug. 26, 1884.
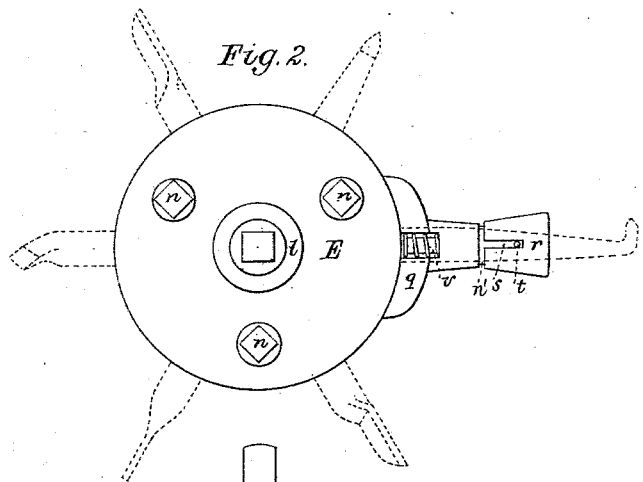
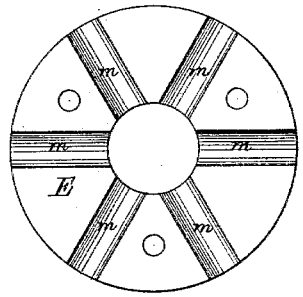
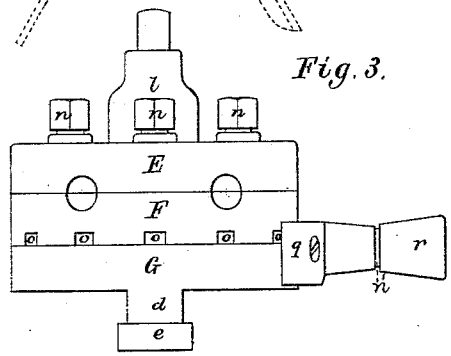
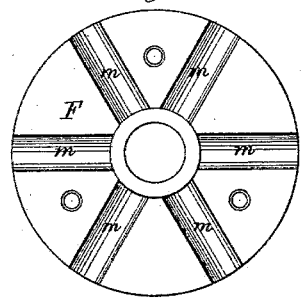
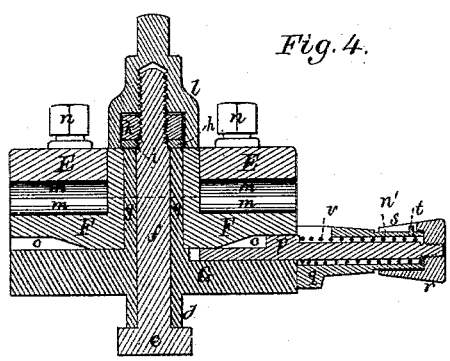
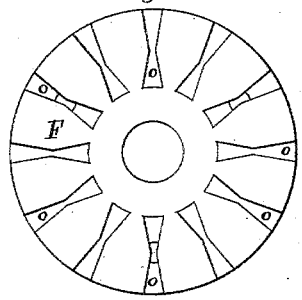
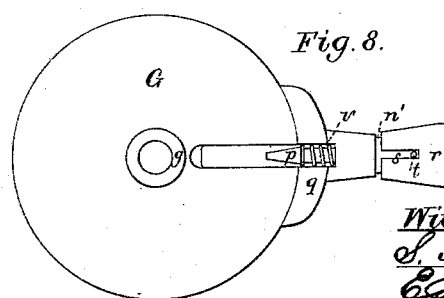
Witnesses.
S. N. Piper.
E. B. Pratt.
Inventor.
John Birkenhead,
by R. H. Eddy, atty.

UNITED STATES PATENT OFFICE.

JOHN BIRKENHEAD, OF MANSFIELD, MASSACHUSETTS.

TURRET OR TOOL-SUPPORT.

SPECIFICATION forming part of Letters Patent No. 303,975, dated August 26, 1884.

Application filed October 9, 1883. (No model.)

*To all whom it may concern:*

Be it known that I, JOHN BIRKENHEAD, of Mansfield, in the county of Bristol, of the Commonwealth of Massachusetts, have invented a new and useful Improvement in Turrets or Tool-Supports; and I do hereby declare the same to be described in the following specification, and represented in the accompanying drawings, of which—

Figure 1:
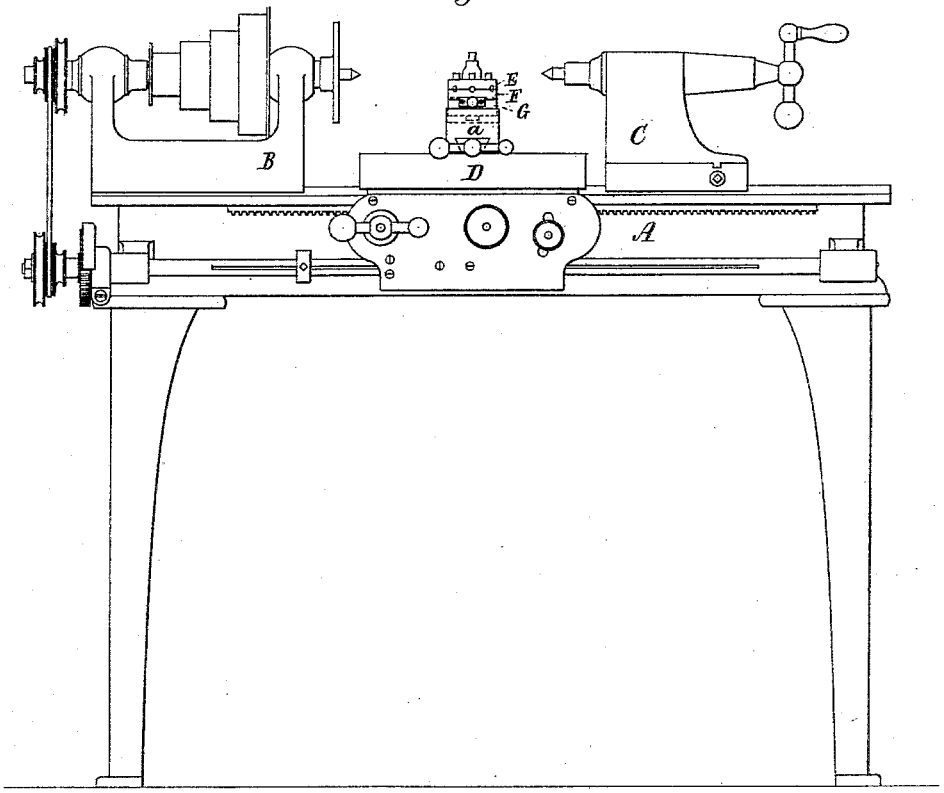
Figure 9:
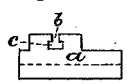

Figure 1 is a front elevation of a lathe provided with a rotary tool-supporter or turret to be described. Fig. 2 is a top view. Fig. 3 a side elevation, and Fig. 4 a vertical and transverse section, of the tool-supporter or turret and its sustaining-plate. Fig. 5 is an under side view of the upper section, and Fig. 6 is a top view of the lower section, of the turret. Fig. 7 is a bottom view of such lower section. Fig. 8 is a top view of the base or sustaining-plate of the turret. Fig. 9 is a side view of the upper movable section, $a$, of the tool-carriage of the lathe, showing the grooves $b$ and $c$.

The nature of my invention is defined in the claims hereinafter presented.

The upper and lower sections of the turret, as represented, are intended to support and carry arranged in and projecting from them in radial directions a series of six turning-tools, differing in their constructions, these sections being duly socketed to receive the shanks of the tools, and provided with screws to cause the said sections to clamp the said shanks. Furthermore, there is in the lower part of the lower section a series of wedge-shape notches, there being twelve of them represented, with one of them directly underneath each of the sockets, such notches being to successively receive a movable bolt duly applied to the sustaining-plate. This bolt is provided with means for holding it out of engagement with the lower section. There are also to the upper and lower sections additional devices for clamping them to the said plate, all of which are more particularly referred to and described.

In the drawings a lathe is shown provided with a head-stock, B, a tail-stock, C, and a tool-carriage, D, they being arranged and applied to the base A, in the usual manner.

The turret or rotary tool-supporter is shown as having its base-plate G adapted to and resting on the upper movable section, $a$, of the tool-carriage D, such section having in it a groove, $b$, extending diametrically across it, and directly over a wider groove, $c$, going across it in like manner. The tool-supporter or rotary turret is composed mainly of two circular plates or sections, E F, equal in diameter, and arranged, as represented, over a sustaining base or plate, G, which has projecting down from it diametrically a guide-lip, $d$, to enter and fit the aforesaid groove $b$. There is within the groove $c$ the head $e$ of a screw-bolt, $f$, whose shank goes up concentrically through a tubular journal, $g$, projecting upward from the plate G. The two sections E and F turn freely on the said journal, and are held from rising thereon by means of a metallic ring, $h$, that lies upon the section F, rests on a shoulder, $i$, of the bolt $f$, and is forced down upon such shoulder by a nut, $k$, screwed on the screw of the bolt. There is also screwed on said screw of the bolt an auxiliary or bell-shaped nut, $l$, that can be screwed down against the section F. The two sections E and F of the rotary turret are socketed, as shown at $m$, to receive the shanks of the tools, such tools, when in place, projecting from the sections, in manner as shown by dotted lines in Fig. 2. Extending down through the upper section, E, and screwed into the section F are three screws, $n$, that serve to clamp the sections to the shanks of the tools. The lower section has in its lower part a series of twelve tapering or wedge-shaped notches, $o$, to receive a wedge-shaped bolt, $p$, that slides lengthwise in a bracket, $q$, projecting from the periphery of the plate G. To the shank of such bolt a thimble, $r$, is adapted, so as to be capable of being revolved thereon and also on the bracket. In this thimble is a slot, $s$, arranged, as shown, to receive a stud, $t$, projecting up from the bracket, the part $n'$ of the bracket circumscribed by the thimble being cylindrical. Within the bracket and encompassing the shank of the bolt is a spiral spring, $v$, adapted to propel the bolt forward. The thimble is fixed to the bolt, except in being capable of being revolved thereon. By pulling back the thimble beyond the stud and turning the thimble a little against the stud the bolt will be retracted from the lower section and held out of the notch, when the turret will be free to be revolved on its plate G, so as to carry any one of the tools into any part of its orbit of revolution, the auxiliary or bell-shaped nut serving afterward, when screwed down against the turret, to prevent it from revolving.

From the above it will be seen that by means of the rotary turret adapted to revolve horizontally any one of its tools can be brought into action on a piece of work in revolution and sustained by the head and tail stocks; also that the tool can be turned around so as to work in either direction to the right or left of the tool-carriage; also that a tool can be adjusted in range of the axis of the mandrel of the head-stock, in order to effect the drilling or boring of the work, which could not be accomplished were the turret to be revoluble in a vertical plane and not horizontally.

I claim—

1. The combination of the base-plate G, provided with the lip $d$, screw-bolt $f$, ring $h$, nut $k$, tubular journal $g$, and the bolt, as explained, with the circular plates E and F, recessed and notched, and having screws for clamping a series of tools, as specified.

2. The combination of the auxiliary or bell-shaped nut $l$ with the screw-bolt $f$, ring $h$, nut $k$, tubular journal $g$, and base-plate G, and the plates E and F, notched and recessed and provided with clamping-screws $n$, and a bolt, $p$, all being adapted substantially and to operate as set forth.

3. The combination of the stud $t$ and slotted thimble $r$, substantially as set forth, with the bolt $p$, and its supporting-bracket $q$, and the revoluble tool-supporter or turret and its sustaining-plate, all being arranged and adapted in manner to operate essentially as specified.

JOHN BIRKENHEAD.

Witnesses:
R. H. EDDY,
S. N. PIPER.